United States Patent
Ashe, Jr. et al.

(10) Patent No.: US 6,664,681 B1
(45) Date of Patent: Dec. 16, 2003

(54) METHODS AND APPARATUS FOR ATTACHING A GRILL TO A MOTOR

(75) Inventors: Lester Bruce Ashe, Jr., Fort Wayne, IN (US); Timothy Wilbur Carey, Kendallville, IN (US); Michael Andrew Cook, Silver Lake, IN (US); Son Cao Huynh, Fort Wayne, IN (US); Laura Ann Leany, Fort Wayne, IN (US)

(73) Assignee: General Electric Company, Schenectady, NY (US)

( * ) Notice: Subject to any disclaimer, the term of this patent is extended or adjusted under 35 U.S.C. 154(b) by 132 days.

(21) Appl. No.: 09/617,896

(22) Filed: Jul. 17, 2000

Related U.S. Application Data

(60) Provisional application No. 60/173,164, filed on Dec. 27, 1999.

(51) Int. Cl.[7] .................................................. H02K 5/00
(52) U.S. Cl. .......................................... 310/89; 29/596
(58) Field of Search .............................. 310/89, 91, 85, 310/101, 59; 174/50, 54, 52.1; 220/327; 411/81, 967; 29/596

(56) References Cited

U.S. PATENT DOCUMENTS

| | | | | |
|---|---|---|---|---|
| 3,693,237 A | * | 9/1972 | Grube | 29/432.2 |
| 3,731,126 A | * | 5/1973 | Hagenlocher et al. | 310/68 R |
| 4,186,319 A | * | 1/1980 | Dochterman | 310/89 |
| 4,288,712 A | * | 9/1981 | Hagenlocher et al. | 310/91 |
| 4,491,047 A | * | 1/1985 | Butkiewicz et al. | 83/817 |
| 4,644,204 A | * | 2/1987 | Lakin | 310/89 |
| 4,934,041 A | * | 6/1990 | Hoover et al. | 29/596 |
| 5,035,398 A | * | 7/1991 | Chiang | 248/674 |
| 5,117,656 A | * | 6/1992 | Keck et al. | 417/360 |
| 5,582,507 A | * | 12/1996 | Alizadeh | 248/604 |
| 5,686,773 A | * | 11/1997 | Sakakibara et al. | 310/91 |
| 5,696,416 A | * | 12/1997 | Baker et al. | 310/91 |
| 5,710,468 A | * | 1/1998 | Church et al. | 310/90 |
| 5,905,230 A | * | 5/1999 | Marik | 174/65 R |

FOREIGN PATENT DOCUMENTS

| | | | | |
|---|---|---|---|---|
| EP | | 1100184 A1 | * 5/2001 | B61C/3/00 |

* cited by examiner

Primary Examiner—Joseph Waks
(74) Attorney, Agent, or Firm—Karl A. Vick, Esq.; Armstrong Teasdale LLP

(57) ABSTRACT

A mounting system for a motor assembly includes a plurality of fasteners for mounting a grill to a motor. The motor includes an endshield including a plurality of attachment points for attaching the endshield to the motor assembly and a plurality of openings for attaching the endshield to the grill. The grill is configured to be mounted to one of a first motor assembly and a second motor assembly. The endshield is formed with either a plurality of bosses including openings or a plurality of self-clinching nuts pressed into the plurality of openings.

18 Claims, 3 Drawing Sheets

METHODS AND APPARATUS FOR ATTACHING A GRILL TO A MOTOR

CROSS REFERENCE TO RELATED APPLICATION

This application claims the benefit of U.S. Provisional Application No. 60/173,164, filed Dec. 27, 1999.

BACKGROUND OF THE INVENTION

This application relates generally to motors, and, more particularly, to mounting systems for motors.

One type of motor includes an endshield and a motor shell attached together to form a motor housing. Often such motors utilize environmental air for cooling purposes and are thus often mounted adjacent meshed grills. Additionally, because of space constraints and structural considerations, these motors are often mounted directly to grills with mounting systems.

Typically the mounting systems include a plurality of bolts attached to and extending from the motor housing. Such mounting systems are covered to prevent inadvertent contact with the bolts. Additionally, the mounting systems are subjected to stresses from supporting the weight of the motor and any associated attachments, i.e. fans, connected to the motor. Vibrations are induced within the mounting systems from motors that are operating. Additionally, vibrations induced within the grill are often transferred to the mounting system. As a result, often the mounting systems loosen and fail.

To prevent such failures, typically the mounting systems include extensive damping systems to minimize the effects of the vibrations. Furthermore, because different motors utilize different motor housings, each motor uses a different mounting system.

BRIEF SUMMARY OF THE INVENTION

In an exemplary embodiment, a motor assembly includes an endshield configured to attach to a grill without any brackets and with a plurality of fasteners. The motor assembly includes a first motor including an endshield and a motor can. The endshield includes a plurality of first openings and a plurality of second openings. The first openings are sized to receive fasteners for attaching the endshield to the motor can. The second openings are sized to receive fasteners for attaching the endshield to the grill. In one embodiment, the endshield is formed with a plurality of bosses including a center opening sized to receive a fastener. The fastener simultaneously cuts threads within the boss openings and mounts the grill to the motor. The grill is configured to also mount to a second motor. Because the second motor includes openings positioned the same with respect to the grill, a universal grill may be mounted to both motors. The endshield mounting system eliminates a need for mounting systems that include pluralities of bracket. Furthermore, the endshield mounting system eliminates a need for a plurality of grills including different mounting arrangements. As a result, a motor assembly is provided that is reliable and cost-effective.

DETAILED DESCRIPTION OF THE INVENTION

Figure 1:
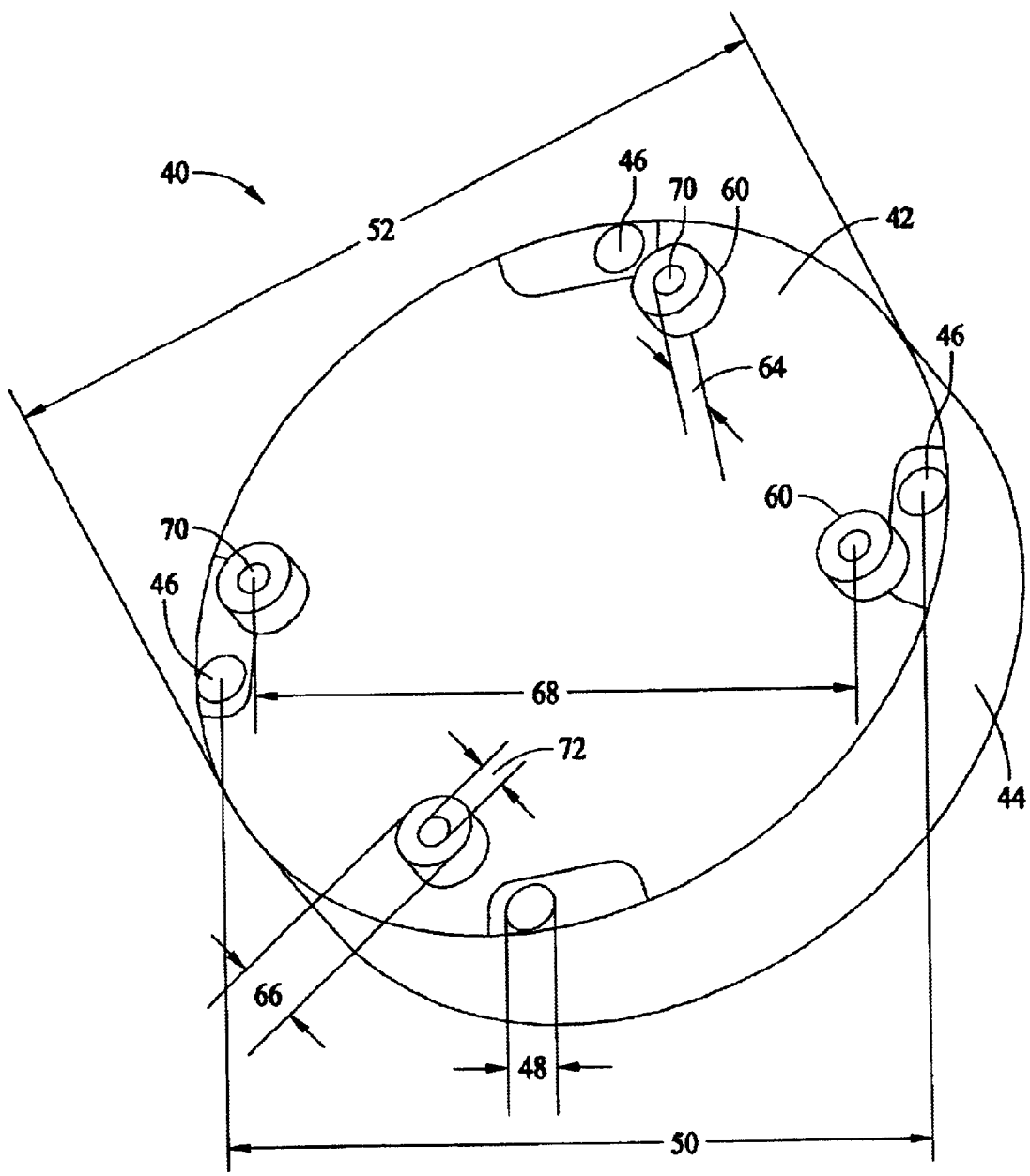
FIG. 1 is a perspective view of an endshield for use with a motor.

FIG. 1 is a perspective view of one embodiment of an endshield 40 used in conjunction with a motor (not shown). The motor is used in a variety of applications. In one embodiment, the motor includes a motor housing assembly (not shown) including endshield 40 and a motor can (not shown) and is used in a heating, ventilation, and air conditioning system. In another embodiment, motor endshield 40 is used with a NEMA 48 motor available from General Electric Industrial Systems, Fort Wayne, Ind. and endshield 40 is fabricated from die-cast aluminum. Endshield 40 has a circular bottom 42 and a side wall 44 extending substantially perpendicularly circumferentially from bottom 42. A plurality of first openings 46 are disposed within endshield bottom 42 and have a diameter 48 sized to receive motor fasteners (not shown) to attach endshield 40 to the motor can. In one embodiment, endshield 40 includes four first openings 46. Openings 46 are spaced circumferentially around endshield 40 at a diameter 50 measured with respect to a center axis (not shown) of the motor. Diameter 50 is smaller than a diameter 52 of endshield 40.

Endshield 40 also includes a plurality of bosses 60 extending from endshield bottom 42 a distance 64. In one embodiment, four bosses 60 are molded with endshield 40. Bosses 60 include a diameter 66 and are positioned at a bolt circle diameter 68 with respect to the center axis of the motor. Bolt circle diameter 68 is smaller than endshield diameter 52 and first opening location diameter 50. In one embodiment, bolt circle diameter 68 is approximately 4.33 inches.

A plurality of second openings 70 are disposed within bosses 60. In one embodiment, endshield 40 includes four openings 70. Second openings 70 include a diameter 72 sized to receive a plurality of fasteners (not shown in FIG. 1) for attaching a grill (not shown) to endshield 40. Bosses 60 provide a greater surface area for thread engagement and thus, greater stability for the fasteners. Threads are formed within openings 70 by the fasteners as the fasteners mount the grill to endshield 40. In one embodiment, the fasteners are trilobular thread forming screws. Simultaneously forming the threads within openings 70 helps prevent loosening of the fasteners during operation of the motor.

Figure 2:
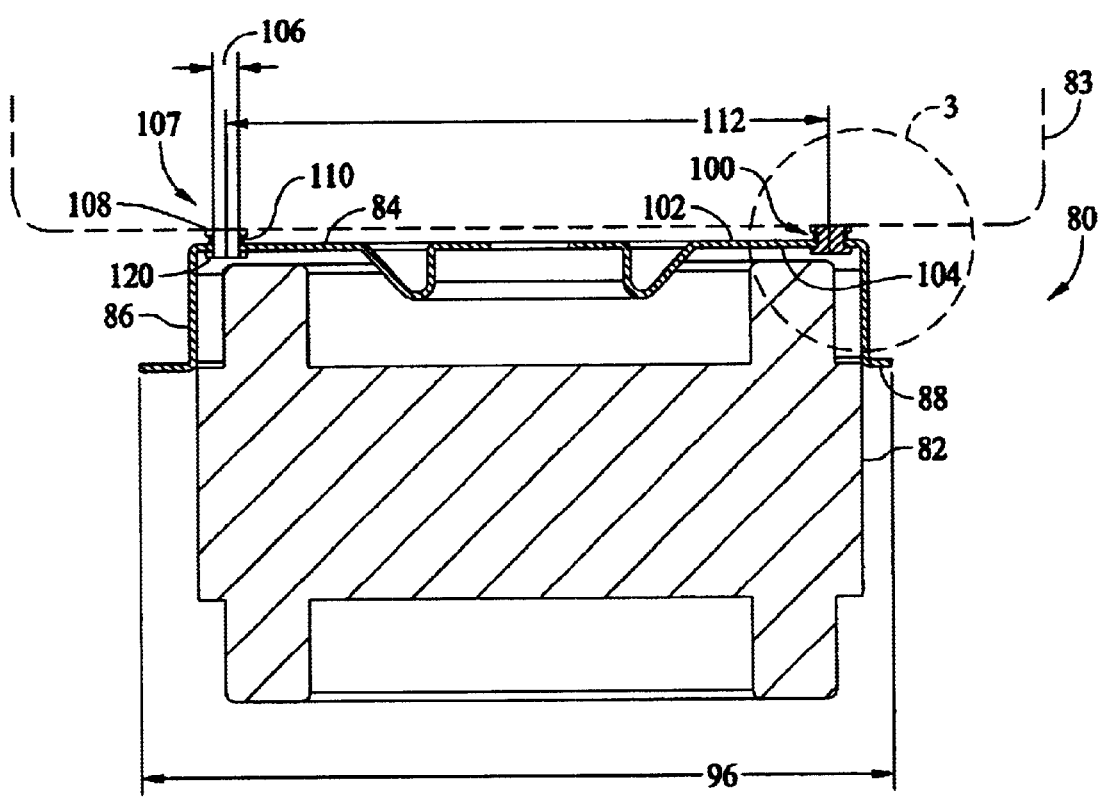
FIG. 2 is a cross-sectional view of an alternative embodiment of an endshield for use with a motor.

FIG. 2 is a cross-sectional view of an alternative embodiment of an endshield 80 for use with a motor 82. Motor 82 is used in a variety of applications. In one embodiment, motor 82 includes endshield 80 and a motor shell (not shown) and is used in a heating, ventilation, and air conditioning system. In another embodiment, motor 82 is a NEMA 42 motor available from General Electric Industrial Systems, Fort Wayne, Ind. and endshield 80 is fabricated from deep-drawn steel. Endshield 80 has a circular bottom 84 and a side wall 86 extending substantially perpendicularly from bottom 84 and circumscribing bottom 84. A flange 88 extends from endshield bottom 84 and permits endshield 80 to attach to the motor shell. In one embodiment, endshield 80 has a diameter 96 and attaches to the motor shell with a toggle lock (not shown).

Endshield 80 also includes a plurality of openings 100 disposed within endshield bottom 84. Openings 100 extend from an exterior surface 102 of endshield 80 to an interior surface 104 of endshield 80. In one embodiment, endshield 80 includes four openings 100. Each opening 100 has a diameter 106 sized to receive a mounting system 107 which includes a plurality of fasteners 108 for attaching a grill 110 to endshield 80. Grill 110 is configured to attach to a second motor 83, or, and for example, fasteners 108 may also attach grill 110 to endshield 40 (shown in FIG. 1). In one embodiment, opening diameter 106 is approximately 0.25 inches. Openings 100 are circumferentially spaced within endshield bottom 84 and are positioned at a bolt circle diameter 112 with respect to a center axis 114 of motor 82. Bolt circle diameter 112 is smaller than endshield diameter 96. In one embodiment, bolt circle diameter 112 is equal bolt circle diameter 68 (shown in FIG. 1) and is approximately 4.33 inches.

A plurality of self-clinching nuts 120 are disposed within endshield openings 100. In one embodiment, self-clinching nuts 120 are pressed from within motor cavity 92 into endshield openings 100 prior to endshield 80 attaching to the motor shell. Self-clinching nuts 120 are sized to receive fasteners 108 and provide a threading area for fasteners 108 to secure grill 110 to endshield 80. In one embodiment, self-clinching nuts 120 are made of carbon steel with a zinc clear coating.

Figure 3:
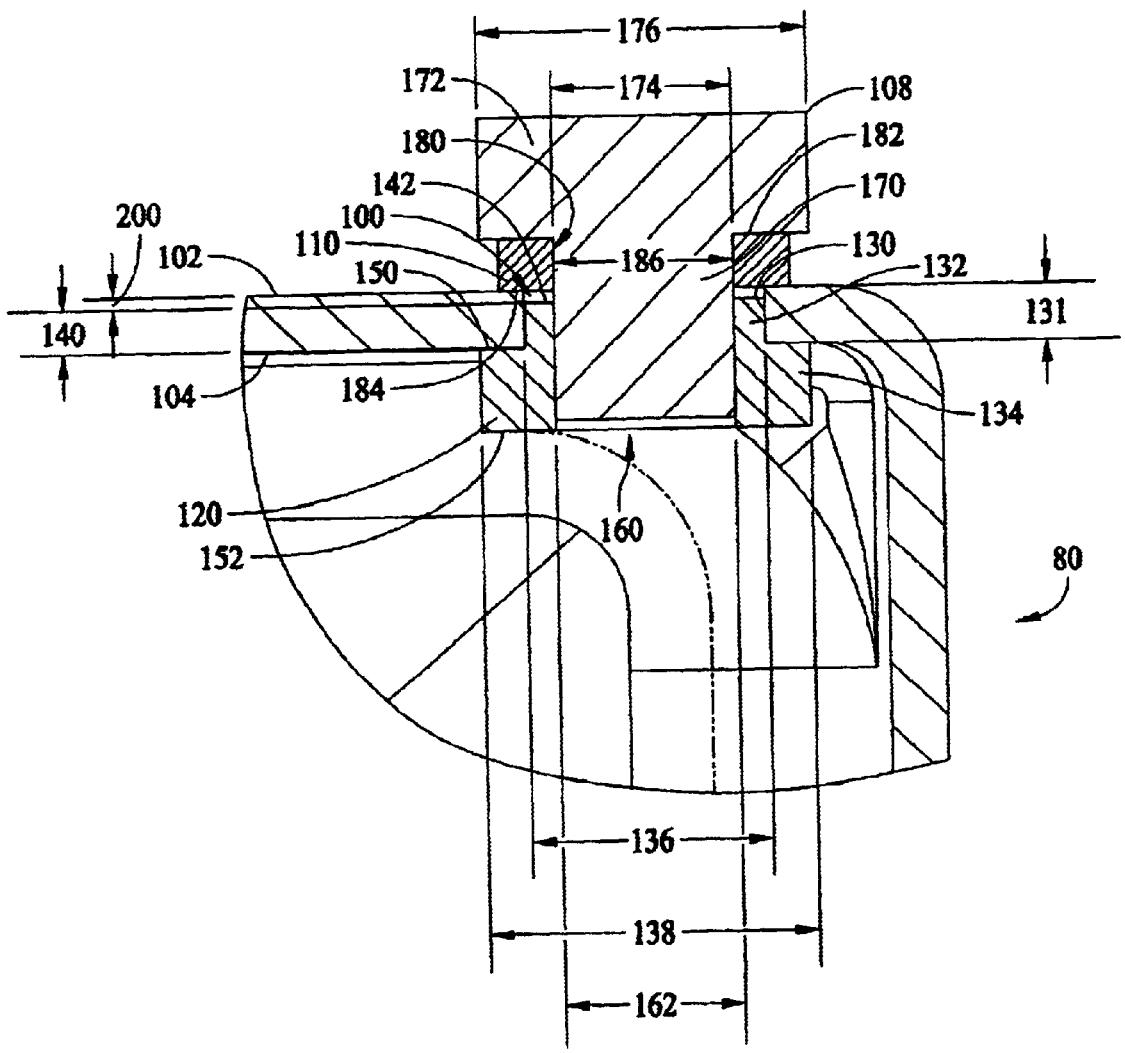
FIG. 3 is an enlarged cross-sectional view of the endshield shown in FIG. 2 taken along area 3.

FIG. 3 is an enlarged cross-sectional view of endshield 80 taken along area 4 shown in FIG. 3. Openings 100 are defined by an inner wall 130 having a height 131 between endshield exterior surface 102 and interior surface 104. Openings 100 are sized to receive fasteners 108 and self-clinching nuts 120.

Each self-clinching nut 120 is annular and includes a first body portion 132 and a second body portion 134. First body portion 132 extends from second body portion 134 and has an outer diameter 136 smaller than an outer diameter 138 of second body portion 134. First body portion outer diameter 136 is slightly smaller than endshield opening diameter 106. Second body portion outer diameter 138 is larger than opening diameter 106. Accordingly, only self-clinching nut first body portion 132 is sized to be received within endshield opening 100.

Additionally, self-clinching first body portion 132 has a thickness 140 extending from a top surface 142 of first body portion 132 to second body portion 134. Thickness 140 is less than opening inner wall height 131. Second body portion 134 extends from first body portion 132 and has a thickness 144 larger than first body portion thickness 140. Second body portion thickness 144 extends between a top surface 150 and a bottom surface 152 of second body portion 134.

An opening 160 extends through self-clinching nut 120 and has a diameter 162. Opening diameter 162 is sized to receive fastener 108 and is constant between self-clinching nut top surface 142 and self-clinching nut bottom surface 152.

Each fastener 108 includes a body portion 170 and a head portion 172. Fastener body portion 170 extends from head portion 172 and has a cylindrical cross-sectional profile and a diameter 174. Fastener body diameter 174 is approximately equal to self-clinching nut opening diameter 162. Fastener head portion 172 has a diameter 176 larger than endshield opening diameter 106. In one embodiment, fasteners 108 are trilobular thread forming screws that form threads within self-clinching nuts 120 while simultaneously securing grill 110 to motor 82.

Grill 110 includes a plurality of openings 180 extending from a top surface 182 to a bottom surface 184 of grill 110. Each opening 180 has a diameter 186 slightly larger than fastener body portion diameter 174 and smaller than fastener head portion diameter 176. Grill opening diameter 186 is constant from grill top surface 182 to grill bottom surface 184. Grill openings 180 are configured to permit grill 110 to either mount to motor 82 or to a second motor (not shown). In one embodiment, grill openings 180 are positioned to mount to any motor including a mounting system 107 including bolt circle diameter 68 or 112.

During assembly of motor 82, self-clinching nut 110 is inserted within endshield opening 100 such that self-clinching nut first body portion 132 enters endshield opening 100 and circumferentially contacts opening inner wall 130 and self-clinching nut second body portion top surface 150 contacts endshield interior surface 104 circumferentially around endshield opening 100. Because first body portion thickness 140 is less than opening inner wall height 131, first body portion top surface 142 remains within endshield opening 100 a distance 200 from grill 110. Endshield 80 is attached with the fasteners to the motor shell to complete the assembly of motor 82. Fastener 108 is inserted through grill opening 180 and is tightened into endshield opening 100 to simultaneously cut threads within self-clinching nut 120 and secure grill 110 to motor 82.

The above described motor endshield mounting system for attaching a grill to a motor assembly is cost-effective and reliable. Each motor includes an endshield including a plurality of attachment points for attaching the endshield to the motor assembly, and a plurality of openings for attaching the endshield to the grill. In each embodiment, the plurality of openings for attaching the endshield to the grill are positioned at the same bolt circle diameter. The grill is configured to attach to the first motor or the second motor. As a result, endshields are provided which are reliable and cost-effective.

While the invention has been described in terms of various specific embodiments, those skilled in the art will recognize that the invention can be practiced with modification within the spirit and scope of the claims.

What is claimed is:

1. A method for mounting a grill to one of a first motor assembly and a second larger motor assembly with a mounting system, the mounting system including a plurality of fasteners, the first motor including an endshield including a plurality of attachment points and a plurality of openings, the attachment points for attaching the endshield to the first motor assembly, the openings for attaching the first motor assembly to the grill, said method comprising the steps of:

attaching the first motor endshield to the first motor assembly using the plurality of attachments points; and attaching the grill to one of the first motor assembly and the second motor assembly using the plurality of openings.

2. A method in accordance with claim 1 wherein the first motor endshield further comprises a plurality of bosses, the plurality of openings disposed within the plurality of bosses, said step of attaching the grill further comprising the step of inserting the plurality of fasteners through the first motor bosses.

3. A method in accordance with claim 2 wherein the first motor endshield attachment points include a plurality of second openings disposed within the endshield, said method further comprising the step of simultaneously forming threads within the plurality of first motor first openings with the plurality of fasteners while attaching the grill to the first motor assembly.

4. A method in accordance with claim 1 wherein the first motor endshield further comprises a plurality of self-clinching nuts, the self-clinching nuts disposed within the plurality of openings, said step of attaching the grill further comprising the step of inserting the plurality of fasteners through the grill into the first motor endshield self-clinching nuts.

5. An endshield for a first motor assembly configured to attach to a grill, the grill configured to attach to one of the first motor assembly and a second larger motor assembly, said endshield comprising:

a plurality of attachment points for attaching said endshield to the first motor assembly; and a plurality of openings for attaching said endshield to the grill.

6. An endshield in accordance with claim 5 wherein said plurality of attachment points are disposed at a first diameter, said plurality of openings disposed at a second diameter.

7. An endshield in accordance with claim 6 wherein said first diameter larger than said second diameter.

8. An endshield in accordance with claim 7 further comprising a plurality of bosses, said plurality of openings disposed within said bosses.

9. An endshield in accordance with claim 7 further comprising a plurality of self-clinching nuts.

10. An endshield in accordance with claim 9 wherein said plurality of self-clinching nuts are disposed within said plurality of openings.

11. A motor assembly comprising:

a grill configured to attach to one of a first motor assembly and a second larger motor assembly; and a first motor comprising an endshield comprising a plurality of attachment points and a plurality of openings, said attachment points configured to attach said endshield to said first motor assembly, said openings configured to attach said first motor endshield to said grill.

12. A motor assembly in accordance with claim 11 wherein said first motor endshield openings are sized to receive a plurality of fasteners for connecting said first motor to said grill.

13. A motor assembly in accordance with claim 12 wherein said first motor endshield attachment points disposed at a first diameter, said first motor endshield openings disposed at a second diameter.

14. A motor assembly in accordance with claim 13 wherein said first diameter smaller than said second diameter.

15. A motor assembly in accordance with claim 14 wherein said first motor endshield further comprises a plurality of bosses.

16. A motor assembly in accordance with claim 15 wherein said first motor endshield openings disposed within said first motor endshield bosses.

17. A motor assembly in accordance with claim 16 wherein said first motor endshield further comprises a plurality of self-clinching nuts.

18. A motor assembly in accordance with claim 17 wherein said first motor endshield self-clinching nuts disposed within said motor endshield openings.

* * * * *

UNITED STATES PATENT AND TRADEMARK OFFICE
CERTIFICATE OF CORRECTION

PATENT NO. : 6,664,681 B1
DATED : December 16, 2003
INVENTOR(S) : Ashe, Jr. et al.

It is certified that error appears in the above-identified patent and that said Letters Patent is hereby corrected as shown below:

Column 4,
Line 44, delete "points; and" and insert therefor -- points, wherein the attachment points extend substantially perpendicularly away from the endshield; and --.

Column 5,
Line 5, between "points" and "for attaching" insert -- extending substantially perpendicularly away from said endshield --.
Line 27, between "configured to" and "attach said" insert -- extend substantially perpendicularly away from said endshield and to --.

Column 6,
Lien 13, delete "smaller" and insert therefor -- larger --.

Signed and Sealed this

Seventh Day of September, 2004

JON W. DUDAS
*Director of the United States Patent and Trademark Office*